Figure 1:
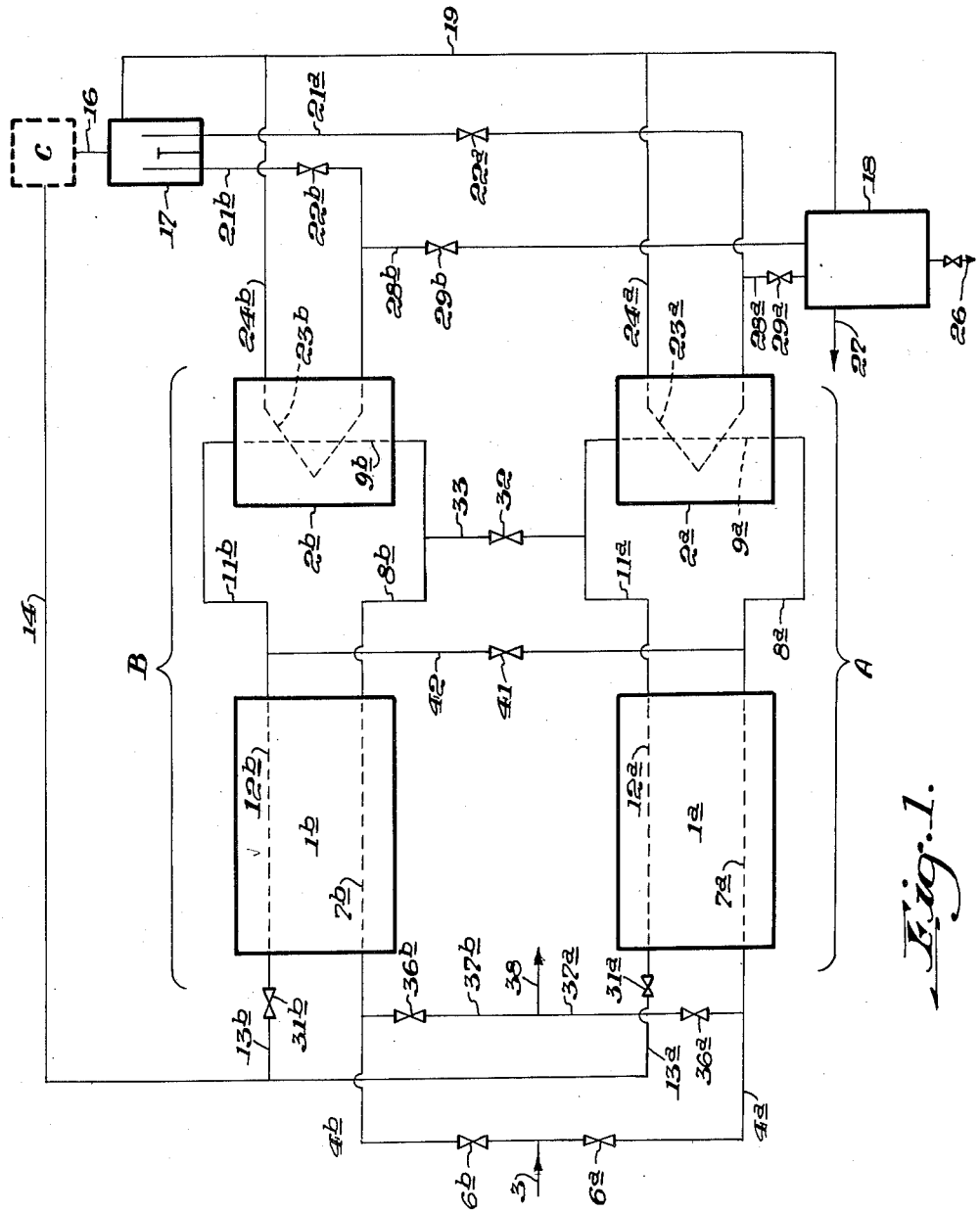

March 25, 1952  D. ARONSON  2,590,145
GAS PURIFYING METHOD AND APPARATUS
Filed April 13, 1950  2 SHEETS—SHEET 1

INVENTOR.
David Aronson
BY
Brown, Critchlow, Flick & Peckham
his ATTORNEYS.

March 25, 1952  D. ARONSON  2,590,145
GAS PURIFYING METHOD AND APPARATUS
Filed April 13, 1950  2 SHEETS—SHEET 2

INVENTOR.
David Aronson
BY
Brown, Critchlow, Flick & Peckham
his ATTORNEYS.

Patented Mar. 25, 1952

2,590,145

UNITED STATES PATENT OFFICE 2,590,145

GAS PURIFYING METHOD AND APPARATUS

David Aronson, Greensburg, Pa., assignor to Elliott Company, Jeannette, Pa., a corporation of Pennsylvania Application April 13, 1950, Serial No. 155,686

6 Claims. (Cl. 62—175.5)

This invention relates to a method and apparatus for purifying a gaseous mixture by cooling the mixture to condense its low volatile impurities and, more particularly, to such a method and apparatus in which the incoming mixture is cooled by outgoing cold purified mixture and by a cold liquefied gas.

It is among the objects of this invention to provide a method and apparatus of the type above referred to, in which the purifying operation can be carried on continuously without shutting down the apparatus for defrosting impurities condensed therein, in which substantially all of the impurities contained in the mixture will be removed at all times, and in which there will be a minimum number of valves operating under low temperature conditions that might subject them to plugging by condensed impurities.

In accordance with this invention, the purifying apparatus comprises a pair of interchangeable purifiers. Each purifier includes a heat exchanger having a passage for the incoming gaseous mixture that is to be purified and a separate passage for countercurrent flow of outgoing cold purified mixture. Each purifier also includes a cooler having a passage for receiving incoming mixture cooled in the exchanger and for returning it as outgoing cold purified mixture to the same exchanger. A second passage is provided in the cooler for a cold liquefied gas. In operation, the incoming mixture admitted to the exchanger is there initially cooled and most of its impurities are condensed in one of the exchanger passages by heat exchange with outgoing cold purified mixture in the other exchanger passage; this initialy cooled mixture is further cooled and purified by heat exchange with the cold liquefied gas in the cooler, whereby residual impurities in the mixture will be condensed in the mixture passage of the cooler; and the resulting cold purified mixture is returned to the outgoing mixture passage of the exchanger. Valve means are provided for switching the incoming mixture and the cold liquefied gas from one purifier to the other when the incoming mixture passages in the first purifier become obstructed by impurities deposited therein. Additional valve means are provided for directing a portion of the outgoing warm purified mixture leaving the unobstructed purifier, after the above switching operation has been effected, to the normal exit of the outgoing mixture passage in the obstructed purifier, whereby said portion will flow through the latter purifier in a direction reverse to the normal flow of mixture therethrough, i. e., said warm portion will pass successively through said outgoing mixture passage in the exchanger, then through the incoming mixture passage in the cooler, and finally through the incoming mixture passage in the exchanger and, in so doing, will sublime and remove the impurities previously deposited in the incoming mixture passages of the obstructed purifier.

Figure 2:
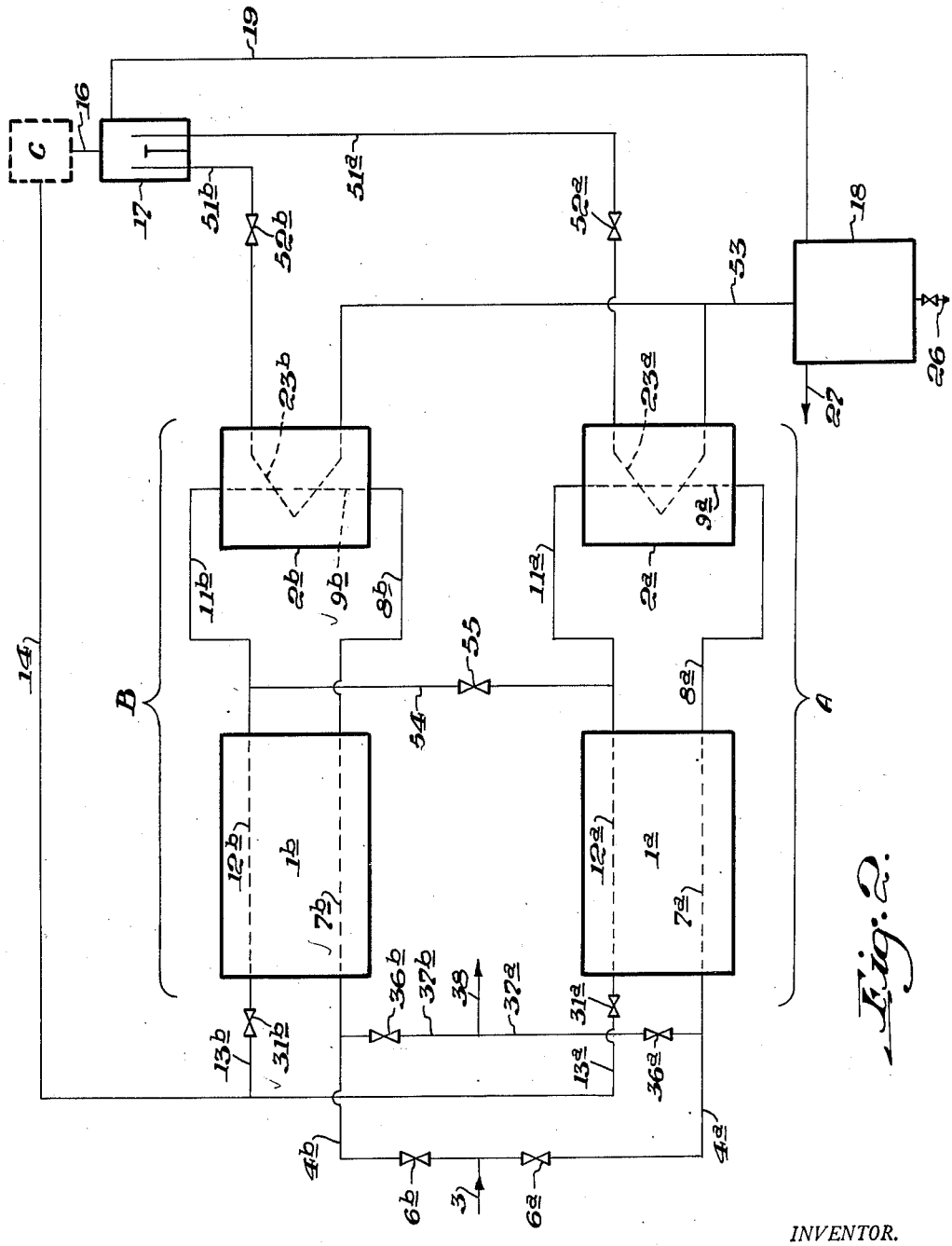

The invention is diagrammatically illustrated in the accompanying drawings, in which Fig. 1 shows the preferred form of the invention and Fig. 2 a modification thereof. The invention will be described as part of an air liquefaction plant, for which it is particularly suited, where the gaseous mixture to be purified is atmospheric air; but it is to be understood that the invention is equally applicable to the purification of other gaseous mixtures.

Referring to Fig. 1, the purifying apparatus includes two interchangeable purifiers A and B, in which the corresponding parts are represented by the same number followed by the letter $a$ or $b$, respectively. Purifier A includes a countercurrent heat exchanger $1a$ and a cooler $2a$. Air is admitted to the system through a pipe 3 and delivered to one of the purifiers through branch pipes $4a$ and $4b$, as determined by the operation of valves $6a$ and $6b$ in the respective branch pipes. Assume that valve $6a$ is open and that valve $6b$ is closed, so that the incoming air will flow through branch pipe $4a$ to purifier A. It is delivered by that pipe to the warm end of a passage $7a$ in exchanger $1a$, and in passing therethrough is cooled as hereinafter explained, so that most of its contained impurities will be condensed and deposited on the walls of that passage. The air that has been initialy cooled and purified in exchanger $1a$ is then conducted from the cold end of passage $7a$ by a pipe $8a$ to the warmer end of a passage $9a$ in cooler $2a$, where it is further cooled by liquid air as described below. The residual impurities in the air entering cooler $2a$ are largely removed by condensation and are deposited in passage $9a$ of the cooler. The air leaving the colder end of that passage is at substantially its liquefaction temperature and is substantially free of low volatile impurities. This cold purified air is conducted by a pipe $11a$ to the cold end of a second passage $12a$ in exchanger $1a$, through which it passes in a countercurrent direction to the flow of incoming air in passage $7a$ and cools the incoming air. The outgoing purified air leaving the warm end of exchanger 1a is led by pipes 13a and 14 to the liquefaction portion of the system, represented generally by C, where the air is liquefied in accordance with any one of the known liquefaction processes.

The liquid air obtained in the liquefaction portion of the plant is delivered by gravity through a pipe 16 to a liquid air feed tank 17, which communicates with a liquid air collecting tank 18 through coolers 2a and 2b and also by an overflow pipe 19. Liquid air is delivered from the feed tank 17 to one of the coolers 2a or 2b by pipes 21a and 21b, respectively, as determined by the operation of valves 22a and 22b in those pipes. When purifier A is operating to purify the incoming air, valve 22b is closed and valve 22a is open, so that liquid air is delivered to the lower end of passage 23a in cooler 2a. It flows up through that passage and is partially vaporized in absorbing heat from the incoming air in passage 9a of the same cooler. The resulting mixture of liquid and vaporized air is then led from the upper end of passage 23a by a pipe 24a to the overflow pipe 19 and thence to the collecting tank 18, from which the liquid may be removed through a drain 26 and the vapor vented through a pipe 27. A pipe 28a joining the inlet of passage 23a and the collecting tank 18 has a valve 29a, which is closed during the operation above described.

After the incoming air has flowed through purifier A for a period of time, the incoming air passages 7a and 9a in that purifier will become obstructed by impurities condensed from the air and deposited on the cold walls of those passages. When the obstruction caused by these deposited impurities is great enough to impair the efficiency of the purifier, the incoming air stream is switched to purifier B in two successive steps, as explained below.

In the first step, the following valves are simultaneously opened and closed: valve 22a in pipe 21a, valve 29b in pipe 28b, and valve 31a in pipe 13a are closed; and valve 22b in pipe 21b, valve 29a in pipe 28a, valve 31b in pipe 13b, and a valve 32 in a pipe 33 (connecting pipes 11a and 8b) are opened.

As a result of the opening and closing of the above valves, the incoming air continues to flow through passage 7a of exchanger 1a and through passage 9a of cooler 2a as above described; but, instead of returning through passage 12a of the same exchanger, the air will be diverted through pipe 33 to passage 9b in cooler 2b and then led through passage 12b of exchanger 1b to the liquefaction portion of the plant. At the same time, the flow of liquid air from the feed tank 17 to cooler 2a will be stopped, and any liquid air in that cooler will drain through pipe 28a to collecting tank 18. Liquid air will now flow from the feed tank through passage 23b of cooler 2b and will cool the air delivered by pipe 33 in passage 9b of the same cooler. The gaseous air flow just described is allowed to continue for only a short period, on the order of one minute, during which purifier A will be warmed in the absence of any refrigeration being supplied to it and purifier B will be cooled a corresponding amount. In effect, this step provides for a transfer of heat from one purifier to the other, preliminary to switching of the incoming air stream from the obstructed to the unobstructed purifier.

In about one minute after the first switching step described above, the second switching step is made. In that step, the incoming air is switched to purifier B by closing valve 6a and opening valve 6b. At the same time, valve 32 is closed to prevent crossflow between the two purifiers through pipe 33. The incoming air will now make the same circuit through purifier B as that previously described in connection with purifier A, i. e., it will pass successively through passage 7b in exchange 1b, through passage 9b in cooler 2b, and through passage 12b in exchanger 1b, after which it is delivered to the liquefaction apparatus C. Liquid air from the feed tank 17 will likewise flow through cooler 2b in the same manner previously described in connection with cooler 2a.

In order to defrost the incoming air passages 7a and 9a in purifier A, some of the warm purified air leaving purifier B through pipe 13b is diverted to purifier A, preferably as part of the second switching step above, or shortly thereafter, by opening valve 31a in pipe 13a and a valve 36a in a pipe 37a (connected to branch pipe 4a). With the opening of those valves, some of the warm purified air leaving purifier B through pipe 13b will flow through purifier A in a direction opposite to the flow of air therethrough in the preceding purification cycle. This warm purified air will first flow through pasage 12a of exchanger 1a, then through passage 9a of cooler 2a, and finally through passage 7a of the same exchanger. It will then be vented to the atmosphere through pipe 37a and a pipe 38 connected thereto. This warm purified air in flowing through purifier A will sublime the impurities condensed in the incoming air passages 9a and 7a of that purifier and will remove those impurities.

After purifier B has been operating for a period of time, it will, in turn, become obstructed by impurities deposited in passages 7b and 9b. When that occurs, the liquid and gas streams flowing to that purifier are again switched in two stages. In the first step, the following valves are simultaneously opened and closed: valves 22b, 29a, 31b, and 36a are closed; valves 22a, 29b, and a valve 41 in a pipe 42 (connecting pipes 8a and 11b) are opened. As a result of these valve operations, the flow of liquid air to cooler 2b will be shut off, and the liquid air remaining in passage 23b of that cooler will be immediately drained into tank 18; and liquid air will now flow from the feed tank through passage 23a of cooler 2a. Concurrently therewith, the incoming air will continue to flow through passages 7b and 9b of purifier B, but instead of returning through exchanger passage 12b of that purifier will be directed by pipe 42 through passages 9a and 12a of purifier A, and thence through pipes 13a and 14 to the liquefier C. The liquid and gas streams are permitted to flow in this manner only momentarily, until purifier A has been cooled down by the desired amount. When that happens, the following valves are operated, preferably at the same time: valves 6b and 41 are closed, and valves 6a, 31b, and 36b are opened. The incoming air will then be purified entirely in purifier A in the manner already described; and a portion of the warm purified air resulting therefrom will be directed through purifier B to remove the impurities deposited therein during the preceding purifying cycle, in the same manner as has already been described in connection with the removal of impurities from purifier A.

It is an advantage of this invention that, during all parts of the purifying cycle, the incoming air is brought into heat exchange with liquid air, which is the coldest fluid in the cycle. As a result, there is no period of time in which impurities in the air will not be condensed and removed from the air stream that enters the liquefaction apparatus in the plant. An additional advantage is that only two valves 32 and 41 operate under low temperature conditions in the presence of any condensible impurities (the valves controlling the flow of liquid air operate at comparable temperatures but no impurities come in contact with them), and these valves are exposed to such impurities for only brief and widely separated intervals of time, so that only a negligible amount of impurities could possibly be deposited in the valves.

A modification of the invention is shown in Fig. 2, in which portions of the apparatus identical with those in Fig. 1 are similarly numbered. In this modification, the liquid air that is used as a refrigerant is delivered from the feed tank 17 by pipes 51a and 51b to the upper ends of passages 23a and 23b in the coolers 2a and 2b, respectively, as determined by the operation of the valves 52a and 52b. As a consequence, the liquid air will flow downward through those passages and drain directly into the collecting tank 18 through a pipe 53. This arrangement is to be distinguished from that shown in Fig. 1, where the liquid air was delivered to the bottom of the liquid air passage in each cooler. While in most cases it may be preferable to follow the arrangement of Fig. 1, the countercurrent flow between the liquid and gas streams in the coolers of Fig. 2 and the elimination of drain valves 29a and 29b offer certain advantages in operation. The only other difference between the apparatus shown in Fig. 1 and that shown in Fig. 2 is the absence in the latter of the valved pipes 33 and 42, and the substitution therefor of a pipe 54, with its valve 55, connecting pipes 11a and 11b.

Except during the brief interval between the first and second switching operations, purifiers A and B in Fig. 2 perform the same functions in the same way as previously described in connection with Fig. 1. When one of the purifiers has become obstructed by the deposits of impurities therein, the liquid and gas streams are switched from one purifier to the other in two steps. In the first step, the following valves are simultaneously opened and closed: valves 31b, 52b, and 55 are opened; and valves 31a and 52a are closed. As a result of this initial switching operation, liquid air is shut off from cooler 2a and delivered to cooler 2b, while the incoming air flowing through exchanger 1a continues to be further cooled in cooler 2a until the liquid air is entirely drained from passage 23a in that cooler. The outgoing purified air leaving cooler 2a is diverted through pipe 55 to the cold end of passage 12b in exchanger 1b (instead of first passing through cooler 2b as in Fig. 1) and flows therethrough to cool that exchanger before the incoming air stream is switched over directly to that exchanger. The conditions prevailing after this initial switching operation continue for about one minute, at the end of which time the liquid air will have been drained from cooler 2a. Cooler 2b will in the meantime have been thoroughly chilled by the liquid air flowing therethrough, and exchanger 1b will have been cooled to about the same extent as exchanger 1a has been warmed.

The second step in switching the liquid and gas streams from one purifier to the other in the modified arrangement shown in Fig. 2 includes the simultaneous operation of the following valves: valves 6a and 55 are closed, and valves 6b, 31a, and 36a are opened. The incoming air will then flow directly through purifier B and will be purified in the same way as previously purified in purifier A. Some of the warm purified air leaving purifier B will now be diverted through obstructed purifier A to remove the impurities previously deposited in passages 9a and 7a in the same manner as has already been described in connection with Fig. 1. The further switching of the liquid and gas streams after purifier B has become obstructed by impurities involves the reverse operation of the valves mentioned above and need not be explained.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for continuously purifying a gaseous mixture by heat exchange with a cold liquefied gas, comprising a pair of interchangeable purifiers; each purifier including (1) a heat exchanger provided with a warm end and a cold end and having a first passage for the incoming gaseous mixture that is to be purified and having a second passage for the countercurrent flow of outgoing gaseous mixture that has previously been cooled and purified, whereby the incoming mixture will be initially cooled by heat exchange with the outgoing mixture and most of the impurities contained in the incoming mixture will be condensed in the first passage of the exchanger, and (2) a liquid cooler having a first passage that connects the cold ends of the first and second passages of the exchanger and having a second passage for the cold liquefied gas, whereby the initially cooled incoming mixture will be further cooled and will be further purified by condensation of its residual impurities in the first passage of the cooler to form said cold purified outgoing mixture; valve means for switching the incoming mixture and the cold liquefied gas from one purifier to the other when the first passages in the exchanger and cooler of one of the purifiers become obstructed by impurities deposited therein by the incoming mixture; and valve means for directing a portion of the purified outgoing mixture withdrawn from the warm end of the unobstructed purifier after said switching operation to the warm end of the second exchanger passage in the obstructed purifier, whereby said portion will flow successively through said second exchanger passage then through the first cooler and exchanger passages in a reverse direction to the previous flow of mixture therein and will remove the impurities previously deposited in both said first passages of the obstructed purifier.

2. Apparatus according to claim 1 that contains the following additional limitations: valved conduits connecting the cold ends of the first and second exchanger passages in one purifier with the cold ends of the second and first exchanger passages respectively in the other purifier; and valve means for stopping the flow of mixture through both exchanger passages in either purifier, whereby the outgoing mixture in one purifier may be momentarily conducted from the cooler in said purifier to the cooler in the other purifier and thence to the second passage in the other purifier at the same time as said switching of liquefied gas from one purifier to the other and before said switching of the incoming mixture.

3. Apparatus according to claim 1 that contains the following additional limitations: a valved conduit connecting the cold end of the second exchanger passage in one purifier with the cold end of the second exchanger passage in the other purifier; and valve means for stopping the flow of mixture through both exchanger passages in either purifier, whereby the outgoing mixture in one purifier may be momentarily directed from the cooler in said purifier to the cold end of the second exchanger passage in the other purifier and thence through said passage to precool said exchanger before said switching of the incoming mixture is effected.

4. A method of continuously purifying a gaseous mixture by heat exchange with a cold liquefied gas that includes the following steps: passing the mixture through a first passage in a first heat exchanger to cool the mixture initially and cause it to deposit impurities in said passage, passing the initially cooled mixture through a passage in a first cooler in indirect heat exchange with the cold liquefied gas to cool the mixture further and cause it to deposit residual impurities in said passage of the cooler, passing the resulting cold purified mixture in a countercurrent direction through a second passage in the first exchanger to effect said initial cooling of the mixture, stopping flow of cold liquefied gas to the first cooler and directing it to a second cooler, stopping flow of incoming mixture to the first exchanger aand directing it through a first passage in a second heat exchanger and then through a passage in a second cooler and finally through a second passage in the second exchanger, directing outgoing purified gas from the second passage in the second exchanger to the warm end of the second passage in the first exchanger and conducting it in reverse direction successively through said second passage, then through the passage in the first cooler and finally through the first passage in the first exchanger to remove impurities previously deposited in said first cooler passage and said first exchanger passage.

5. A method according to claim 4, in which said cold purified mixture is momentarily directed from the first cooler to the passage in the second cooler and then to the second passage in the second exchanger after stopping the flow of liquefied gas to the first cooler but before stopping the flow of incoming mixture, and thereby precool the second exchanger.

6. A method according to claim 4, in which said cold purified mixture is momentarily directed from the first cooler to the cold end of the second passage in the second exchanger after stopping the flow of liquefied gas to the first cooler but before stopping the flow of incoming mixture to the first exchanger, and thereby precool the second exchanger.

DAVID ARONSON.

REFERENCES CITED

The following references are of record in the file of this patent:

UNITED STATES PATENTS

| Number | Name | Date |
|---|---|---|
| 1,376,985 | Wilkinson | May 3, 1921 |
| 1,626,345 | Le Rouge | Apr. 26, 1927 |
| 1,976,933 | Gobert | Oct. 16, 1934 |
| 2,460,859 | Trumpler | Feb. 8, 1949 |
| 2,496,380 | Crawford | Feb. 7, 1950 |
| 2,509,034 | Claitor | May 23, 1950 |
| 2,526,996 | Crawford | Oct. 24, 1950 |
| 2,534,478 | Roberts | Dec. 19, 1950 |